Feb. 3, 1931.  O. DAHL ET AL  1,791,023
REFRIGERATING PLANT
Filed Jan. 13, 1928
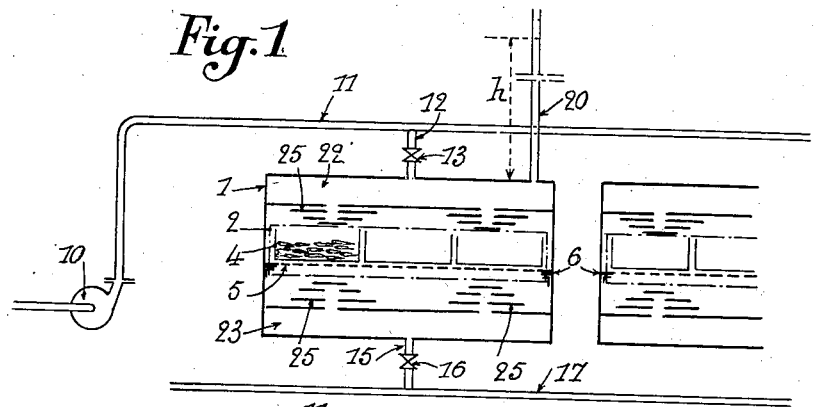
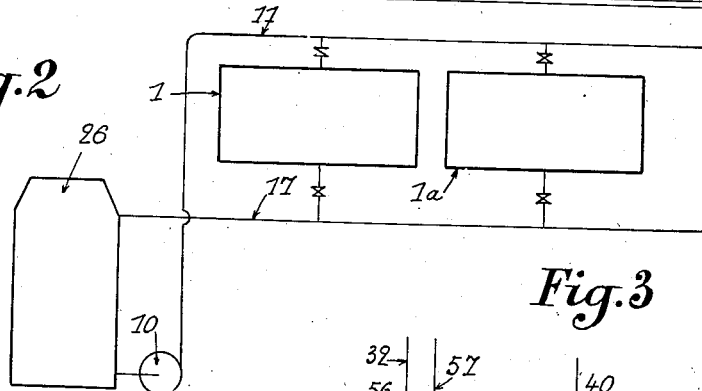
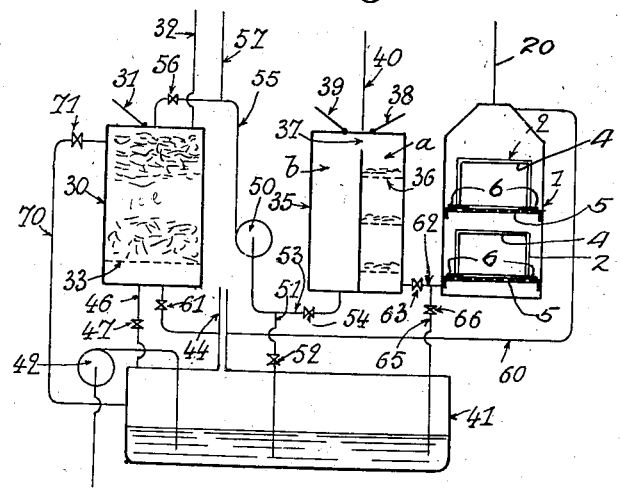
INVENTORS:
Oscar Dahl
Erik Arnfinn Hallgrim Kjørstad
BY: Kruger, Boyer & Bakelar
ATTORNEYS Patented Feb. 3, 1931

1,791,023

UNITED STATES PATENT OFFICE

OSCAR DAHL AND ERIK ARNFINN HALLGRIM KJÖRSTAD, OF LA ROCHELLE, FRANCE

REFRIGERATING PLANT

Application filed January 13, 1928, Serial No. 246,473, and in France July 27, 1927.

The present invention relates to plants for freezing or refrigerating fish or like food by means of cooling liquids, and more particularly to plants adapted to be mounted upon trawlers or like boats for the freezing of the fish as fast as caught.

The known plants for refrigerating fish by means of a cooling brine consisting of ice and salt, operate in a practical and an economical manner provided they are stationary plants, adapted to refrigerate the fish or like products to be cooled upon land.

It has been found that the attempts which have been made in order to mount such plants upon vessels or like vehicles failed to afford practical and economical results, due to the movements, jarring, shocks, etc., to which a vessel is subjected at sea. Experience proved that the agitation, the eddies, and the variations in the level of the cooling liquid, which are due to the motion of the vessel, cause the formation of scum or foam which interferes with the proper operation of the cooling plant.

All such defects are eliminated in the plant according to the invention, in which the fish are treated by the cooling brine in a closed chamber, which is kept entirely filled with liquid, and hence comprises no air space.

According to another feature of the invention, the brine is circulated through the refrigerating chamber at a pressure exceeding atmospheric pressure; the pressure may be varied so that the brine will be circulated faster or slower, and the freezing will thus be more or less rapid.

This method is particularly advantageous in the case in which the brine is obtained under pressure in the apparatus for the preparation of the cooling brine, whereby the apparatus for refrigerating fish may be directly connected with the brine producing apparatus without requiring the use of special means for producing pressure within the said fish refrigerating apparatus, the brine thus circulating in a closed circuit through the brine producing apparatus and the fish refrigerating apparatus.

Figs. 1 to 3 are diagrammatic views showing by way of example various embodiments of the invention.

In the arrangement shown in Fig. 1, the apparatus comprises one or more closed or fluidtight and heat-insulated vessels 1 which are provided with tight doors 2 for inserting the fish. The latter are disposed in perforated baskets or cases 4 which are placed upon the gratings, hurdles or perforated plates 5. Suitable packing members or frames 6, consisting for example of india rubber, may be placed below the said boxes to prevent the liquid from flowing along the walls instead of traversing the fish. The fish may also be placed directly upon the perforated gratings or the like 5; in this case, they should as far as possible be distributed over the whole cross section of the chamber, so as to prevent the brine from passing directly through the chamber instead of traversing the mass of fish.

The cold brine proceeding from a brine producing apparatus, or from a storage tank, is supplied to the said chamber, preferably at the top thereof, and is discharged at the bottom, so that the flow of liquid, circulated at a certain speed through the chamber, will counteract the ascensional force of the fish, and the brine will penetrate between the fish and come into an intimate contact therewith. Although the downward circulation is preferable, the invention also contemplates the case where the brine flows through the mass of fish in the upward direction.

In the embodiment shown in Fig. 1, the brine is delivered to the top of the vessel 1 by a pump 10 through a delivery pipe 11 provided with branch pipes 12 fitted with cocks 13. The brine flows through the fish and is discharged through a pipe 15, provided with a cock 16, and connected with the return pipe 17.

Each refrigerating chamber is provided at the upper part with a pipe or chimney 20, which rises to a sufficient height and is open at the top, the pressure in the vessel corresponding to the height $h$ of the column of liquid in the said pipe.

The chamber being empty, the fish are placed therein, the doors are closed, the cocks 13—16 are opened to the proper degree, and the pump is operated. The brine is thus delivered under pressure to the chamber which becomes completely filled. The air escapes through the pipe 20 in which the brine rises to the level corresponding to the pressure. When the freezing operation is terminated, the pump is stopped and the cock 13 closed, so that the brine will return to the storage tank or brine producing apparatus.

If necessary, the chamber may comprise an inlet compartment 22 and a discharge compartment 23 for the brine, which communicate with the chamber containing the fish by apertures provided with brine distributers 25, consisting of superposed perforated discs of increasing diameters, which are suitably spaced apart.

Each vessel 1 may also be connected with a suction device adapted to withdraw the whole or a part of the air contained in the chamber before the brine is admitted.

The vertical pipes 20 may be replaced by air outlet conduits provided with cocks.

Due to the provision of a closed chamber having no air spaces, the motion of the boat will no longer produce splashing, and the formation of scum or foam is prevented. By opening the cocks 13 and 16 through the suitable amount, the pressure of the liquid in the chamber as well as the speed of the liquid current may be readily controlled, so that the rate of freezing will be regulated as may be desired, and, for instance, according to the nature or to the size of the fish, the pressure may be as high as necessary.

Fig. 2 shows two freezing chambers 1 and 1ª which are connected with a brine producing apparatus 26 of a known type.

Fig. 3 shows a freezing chamber combined with a brine producing apparatus in which the cold brine is obtained under pressure. This apparatus comprises a main receptacle 30 provided with a loading door 31 and a vertical pipe 32, ice being placed upon a perforated bottom plate 33; a salt container 35 comprising a salt chamber $a$ and an adjacent chamber $b$ which serves for regulating purposes. Salt is placed upon perforated plates or the like 36. The two chambers $a$ and $b$ are connected together at the upper part by the aperture 37. The vessel 35 is further provided with a loading door 38, an observation door 39, and a vertical pipe 40. A brine storage tank 41 is supplied at the start with salt solution which is taken for example from the sea by the pump 42, or like means; said tank is provided with an air exit pipe 44, and is connected by a pipe 46—provided with a cock 47—with the lower part of the receptacle 30. A pump 50 has its suction pipe 51 provided with a cock 52 connected with the tank 41.

The pipe 51 is further connected by a branch pipe 53 provided with a cock 54 with the lower part of the chamber $b$ of the vessel 35. The said pump is connected by its delivery pipe 55—provided with the cock 56—to the upper part of the receptacle 30; said tube 55 may be provided with the vertical pipe 57.

The freezing chamber 1 which may be constructed as above described, is provided with the filling doors 2 and with a vertical pipe 20; it is connected at the top with the bottom of the receptacle 30 by means of a pipe 60, provided with a cock 61, and at the lower part with the bottom of the salt chamber $a$ of the vessel 35 by the pipe 62 provided with a cock 63, said cooling chamber may also be directly connected with the tank 41 by the pipe 65 provided with the cock 66.

When the apparatus is first set in operation, a certain amount of salt solution is supplied to the tank 41. The receptacle 30 is filled with ice and the container $a$ with salt, and the chamber 1 is loaded with the fish to be cooled. The cock 54 is closed and the pump is operated, so as to supply brine to the receptacle 30. The brine, which is cooled by the ice, then passes through the mass of fish to be refrigerated or frozen, thence flows through chamber $a$ in which it is charged with salt, and finally proceeds into chamber $b$. When the proper pressure has been obtained, i. e. when the brine rises to the requisite height in the vertical pipes, the cock 52 is closed and the cock 54 opened, and the brine is thus circulated through the three vessels 30—35—1 in a closed circuit and under pressure. By regulating the opening of cocks 61—63—54, different pressures in each vessel may be obtained.

When the fish have been suitably cooled or frozen, cock 63 is closed and cock 66 is opened so that the brine will be discharged from the freezing chamber into the tank 41. The frozen fish may then be removed, and the chamber 1 refilled, and the operation is repeated. The operation of refilling the main receptacle with ice and the salt container with salt will be readily understood from the foregoing.

Receptacle 30 may be connected with tank 41 by an overflow pipe 70 provided with a cock 71.

As shown in Fig. 3, the freezing chamber will preferably have a pointed top, so as to facilitate the discharge of air.

Obviously, the said invention is not limited to the details of construction herein represented. A single brine producing apparatus may be used for the supply of any suitable number of freezing chambers.

The invention further contemplates the application of all the known methods of freezing fish, either by supplying the brine at the central part of the mass of fish, or by circulating the brine in the direction of the length of the fish, or by combining these two methods, etc.

Together with the freezing method using a cooling brine, may be combined the method in which small pieces of ice are inserted in the spaces between the fish, so as to provide a more effective process and a more rapid cooling.

The said invention offers particular advantages for the cooling or freezing of fish upon trawlers or like fishing vessels, but it is also applicable to stationary plants, as well to various goods or food products other than fish. The cold brine may also be utilized for the cooling of cooling storage rooms or refrigerating chambers, and for like purposes.

Having now described our invention, what we claim as new and desire to secure by Letters Patent is:

1. In a plant for refrigerating goods of the character described, particularly on board ships, a tightly closed receptacle adapted to contain the goods to be refrigerated, means for circulating a cooling brine downwardly through said receptacle, and gas discharge means at the top of said receptacle for continuously discharging the gas disengaged from the brine in operation, whereby said receptacle may be kept completely filled with brine.

2. A plant as claimed in claim 1, wherein said gas discharge means consist of a tube in constant communication with the atmosphere.

3. A plant as claimed in claim 1, wherein the upper part of said receptacle has a pointed shape at the top, said gas discharging means consisting of a tube in communication with the atmosphere and opening at the upper pointed part of said receptacle.

4. In a plant for refrigerating goods of the character described, particularly on board ships, a tightly closed receptacle adapted to contain the goods to be refrigerated, a tube in communication with the atmosphere opening at the upper part of said receptacle and means for circulating a cooling brine through said receptacle, whereby said tube is adapted to discharge air disengaged from the brine in operation and to contain a head of brine above said receptacle.

5. A plant for refrigerating goods of the character described, particularly on board ships, comprising in combination an ice receptacle, a salt receptacle, a freezing receptacle adapted to contain the goods to be refrigerated, means for continuously discharging the gas collecting at the top of said ice and freezing receptacles in operation, circulating means for forcing brine through said receptacles successively, and means for independently varying the pressure produced by said circulating means in said ice and freezing receptacles, respectively.

6. In a plant as claimed in claim 1, supporting means in superposed relation in said receptacle, permeable boxes adapted to contain the goods to be refrigerated and to rest on said supporting means and means whereby the brine is prevented from flowing between the walls of said boxes and said supporting means.

7. In a plant as claimed in claim 1, supporting means in superposed relation in said receptacle, permeable boxes adapted to contain the goods to be refrigerated and to rest on said supporting means and packing members interposed between the walls of said boxes and said supporting means for preventing the brine from flowing therebetween.

In testimony whereof we have signed our names to this specification.

OSCAR DAHL.
ERIK ARNFINN HALLGRIM KJÖRSTAD.